United States Patent
Yamanakajima

(10) Patent No.: US 9,733,800 B2
(45) Date of Patent: Aug. 15, 2017

(54) DOCUMENT MANAGEMENT SYSTEM AND DOCUMENT MANAGEMENT METHOD

(71) Applicant: CANON KABUSHIKI KAISHA, Tokyo (JP)

(72) Inventor: Kazunari Yamanakajima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 450 days.

(21) Appl. No.: 14/508,271

(22) Filed: Oct. 7, 2014

(65) Prior Publication Data

US 2015/0113394 A1    Apr. 23, 2015

(30) Foreign Application Priority Data

Oct. 17, 2013   (JP) ................................ 2013-216297

(51) Int. Cl.

| G06F 17/00 | (2006.01) |
| G06F 3/0482 | (2013.01) |
| G06F 17/21 | (2006.01) |
| G06F 17/30 | (2006.01) |

(52) U.S. Cl.
CPC .......... *G06F 3/0482* (2013.01); *G06F 17/212* (2013.01); *G06F 17/30126* (2013.01); *G06F 17/30716* (2013.01)

(58) Field of Classification Search
CPC ............................. G06F 17/211; G06F 17/212
See application file for complete search history.

(56) References Cited

U.S. PATENT DOCUMENTS

| 6,151,610 A * | 11/2000 | Senn ................ G06F 17/30011 707/E17.008 |
| 2002/0059325 A1* | 5/2002 | Beizer ............... G06F 17/30008 |
| 2004/0083432 A1* | 4/2004 | Kawamura .......... G06F 17/243 715/255 |
| 2006/0155757 A1* | 7/2006 | Williams .......... G06F 17/30061 |
| 2008/0307343 A1* | 12/2008 | Robert ................ G06F 3/04817 715/765 |
| 2010/0205168 A1* | 8/2010 | Yang ................. G06F 17/30864 707/709 |
| 2013/0046830 A1* | 2/2013 | MacDonald ............ H04L 51/16 709/206 |

(Continued)

FOREIGN PATENT DOCUMENTS

JP    2006-323815 A    11/2006

*Primary Examiner* — Laurie Ries
(74) *Attorney, Agent, or Firm* — Carter, DeLuca, Farrell & Schmidt, LLP

(57) ABSTRACT

A document management system has a function of displaying documents in a form of threads based on relevance among the documents and dividing the threads into containers for display, the containers each including at least one document and having a date/time attribute. The document management system determines an order in which a plurality of threads are arranged, displays one container included in one of the plurality of threads, selects, from among the containers included in another thread adjacent to the one of the plurality of threads in the determined arrangement order, the container that is most relevant to the currently displayed one container, and controls the displaying so that the container is moved from the currently displayed one container to the selected container for display.

11 Claims, 14 Drawing Sheets

(56) References Cited

U.S. PATENT DOCUMENTS

| | | | |
|---|---|---|---|
| 2013/0060778 A1* | 3/2013 | Yamanakajima | G06F 17/30126 |
| | | | 707/737 |
| 2014/0280602 A1* | 9/2014 | Quatrano | H04W 4/08 |
| | | | 709/205 |
| 2015/0026260 A1* | 1/2015 | Worthley | G06Q 10/10 |
| | | | 709/204 |
| 2015/0039997 A1* | 2/2015 | Tanaka | G06F 17/30126 |
| | | | 715/234 |

* cited by examiner

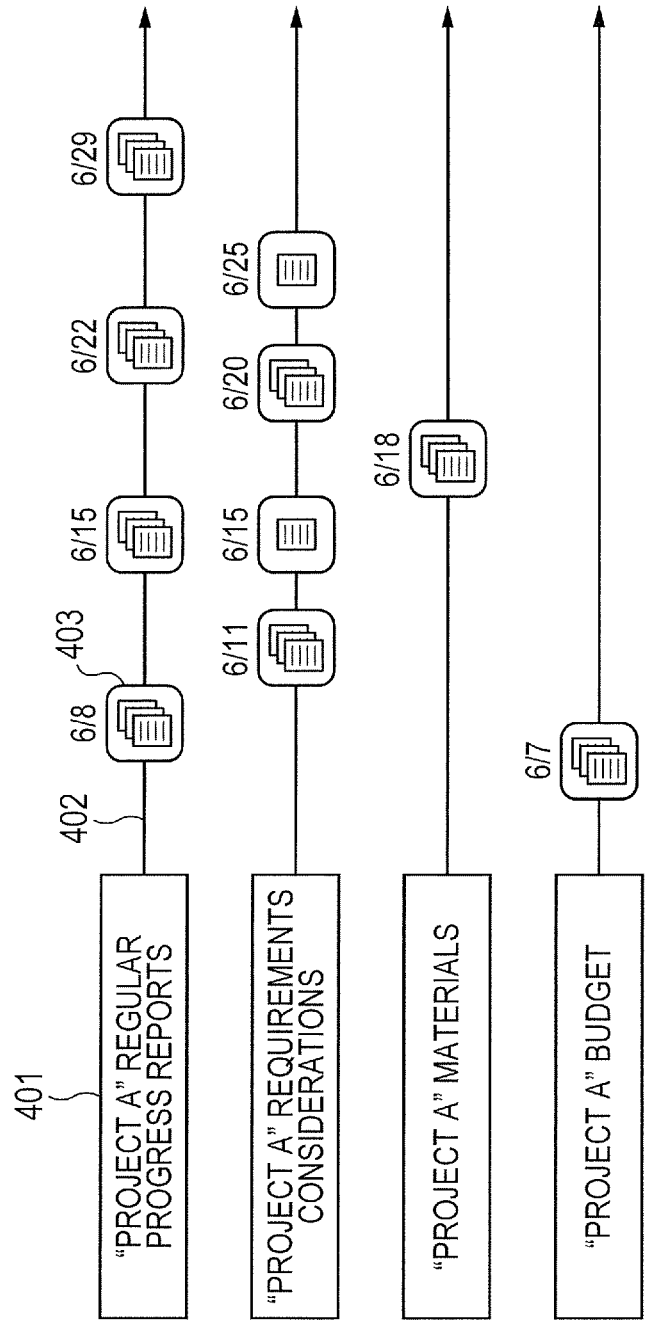

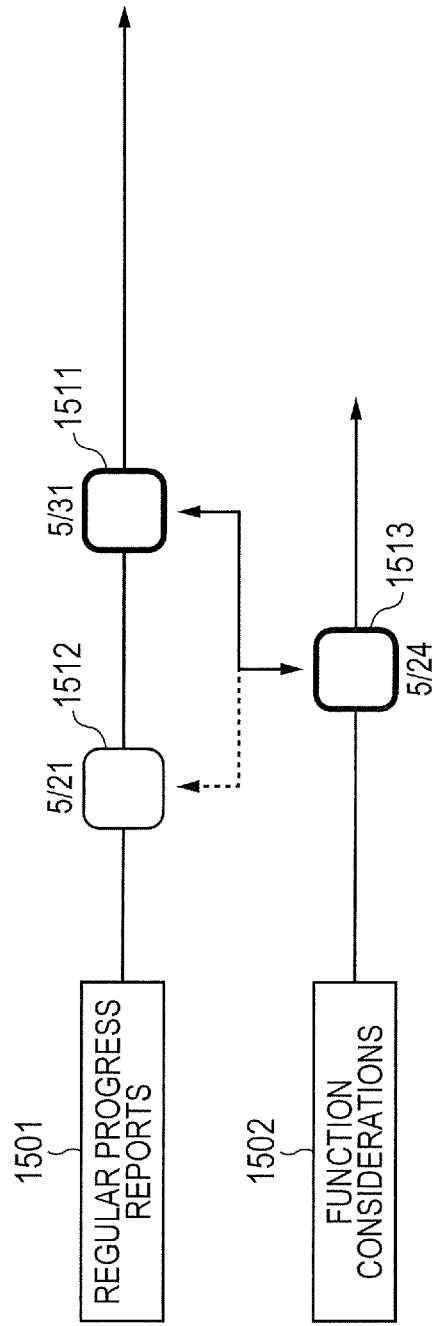

DOCUMENT MANAGEMENT SYSTEM AND DOCUMENT MANAGEMENT METHOD

BACKGROUND OF THE INVENTION

Field of the Invention

The present invention relates to a method of accessing data and a method of operating data in a document management system.

Description of the Related Art

In a document management system, in order to clarify how to access a document, storage locations of documents are expressed in a hierarchical manner with the use of a file path, a URL, or the like in many cases. In addition, in an application for accessing such hierarchical files as well, visibility and operability have been enhanced by expressing the storage structure of the documents in panoramic and hierarchical manners with the use of a tree view or the like.

In recent years, however, how the documents are displayed by an application has also changed with the widespread use of smartphones. The screen size of the smartphone is limited, and hence it is difficult to display the storage structure of the documents in a panoramic manner with the use of the tree view. Accordingly, for example, such a measure that only a part of the tree is displayed has been taken to address this problem, although the visibility and operability are decreased by this measure.

Meanwhile, in the Internet, data management using an electronic bulletin board system has become widespread. As the electronic bulletin board, there is known a "thread float bulletin board system" for displaying a group of data on a specific topic or subject in a collective manner. Moreover, in U.S. Patent Application Publication No. 2006/0155757, there is disclosed a timeline display system involving arranging pieces of data in chronological order for display.

In a personal computer or the like, the storage structure of the documents can be displayed in a panoramic manner by displaying the documents with the use of the tree view or the like. In the smartphone or the like, however, with its limited size of the screen, the above-mentioned problem has been addressed by limiting a part to be displayed and further employing a flat structure such as a thread and a timeline. However, when a part to be displayed is limited to one thread or the like, documents in other threads are hidden, and it is therefore difficult to access other hidden documents.

SUMMARY OF THE INVENTION

In order to overcome the problems of the conventional technology discussed above, the present invention provides a document management system which has a function of displaying documents in a form of threads based on relevance among the documents and dividing the threads into containers for display, the containers each including at least one document and having a date/time attribute, the document management system comprising: a determination unit that determines an order in which a plurality of threads are arranged; a display unit that displays one container included in one of the plurality of threads; a selection unit that selects, from among the containers included in another thread adjacent to the one of the plurality of threads in the determined arrangement order, the container that is most relevant to the currently displayed one container; and a control unit that controls the display unit so that the display unit moves the container from the currently displayed one container to the selected container for display.

Further features of the present invention will become apparent from the following description of exemplary embodiments with reference to the attached drawings.

BRIEF DESCRIPTION OF THE DRAWINGS

FIG. 4 is a conceptual diagram when the data stored in the document management system is expressed as threads.

FIG. 15 illustrates an example of returning to a source thread from a destination thread in the movement to another thread.

DESCRIPTION OF THE EMBODIMENTS

Figure 1:
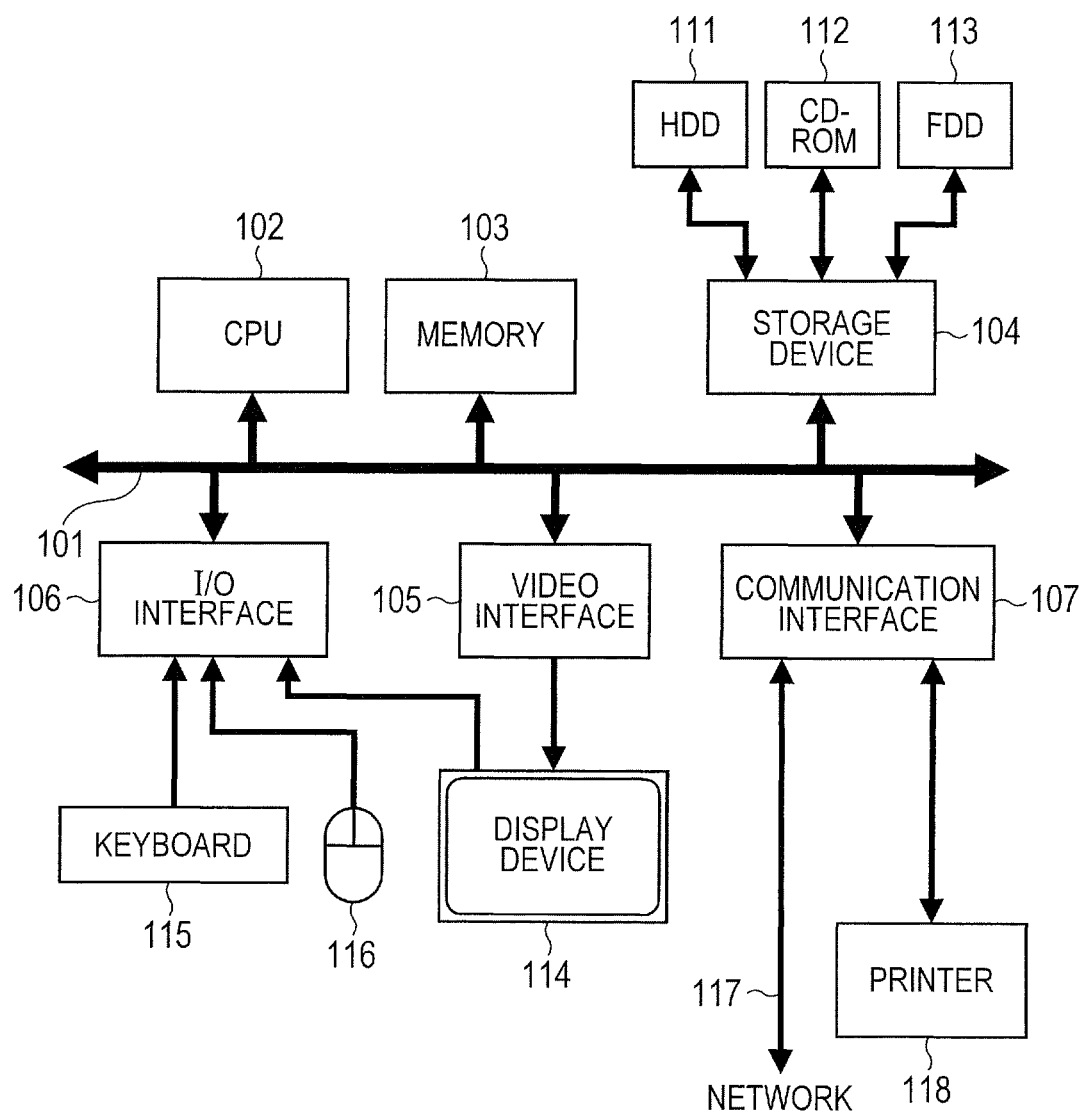
FIG. 1 is a diagram illustrating details of a configuration of a computer according to one embodiment of the present invention.

Now, an exemplary embodiment of the present invention is described with reference to the drawings. FIG. 1 is a diagram illustrating a configuration of an information processing device according to one embodiment of the present invention.

In FIG. 1, the information processing device includes a CPU 102, a memory 103, a storage device 104, a video interface 105, an input/output (hereinafter abbreviated as "I/O") interface 106, and a communication interface 107. The respective components of the information processing device are connected to one another via a system bus 101. The CPU 102 is a central processing unit (processor) configured to control the respective components via the system bus 101, and calculate and process data. The memory 103 is a device configured to store data and programs, and is constructed of a random access memory (RAM) and a read only memory (ROM). The storage device 104 writes and reads stored data. The storage device 104 includes a hard disk drive (HDD) 111, a CD-ROM drive 112, which is used as a non-volatile data source, and a floppy (trademark) disk drive (FDD) 113. Although not shown in FIG. 1, a magnetic tape drive, a DVD-ROM, a USB memory, or the like may also be used as the storage device 104.

A program according to this embodiment is read from the storage device 104 to be stored in the memory 103, and is then executed by the CPU 102. Note that, the program is read from the storage device 104 in this embodiment, but alternatively, the program may be read from the ROM (not shown) or may be read from an outside via the communication interface 107.

The video interface 105 controls a display output to a display device 114. A CRT or liquid crystal display device is used as the display device 114, for example. To the I/O interface 106, input devices including a keyboard 115 and a pointing device 116 are connected. A user operates the keyboard 115 to issue an operation instruction to the information processing device. The pointing device 116 is used to move a cursor displayed on the display device 114 to select and operate a menu and an object, for example. Further, in some cases, the display device 114 is capable of receiving an operation input through a touch panel or the like. In this case, the display device 114 serves both as an output device and an input device. The communication interface 107 performs communication to and from an external apparatus via a computer network 117. A network to be connected is, for example, a LAN, a WAN, or a public line such as the Internet. Further, the communication interface 107 also performs communication to and from other devices including a local printer 118.

Figure 2:
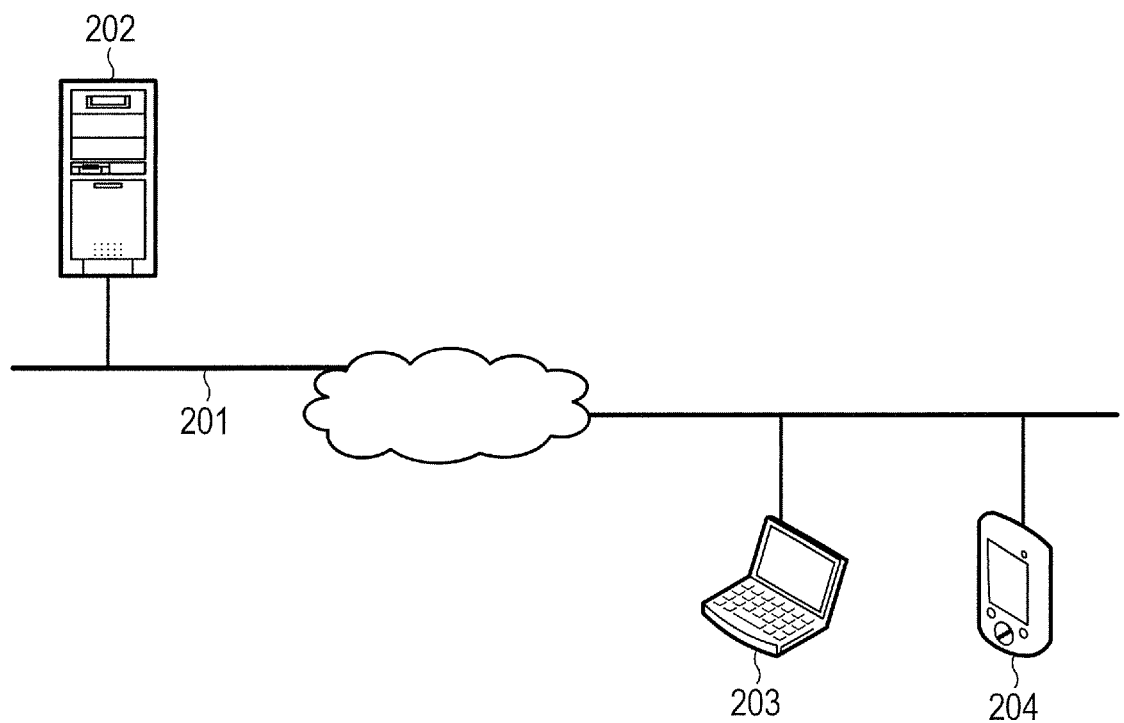
FIG. 2 is a network configuration diagram according to one embodiment of the present invention.

FIG. 2 is a network configuration diagram according to this embodiment. To a computer network 201, a server computer (hereinafter abbreviated as "server") 202 and client terminals 203 and 204 are connected. Modes of the client terminals include a client personal computer (hereinafter abbreviated as "client PC") 203 and a smartphone 204. Examples of the computer network 201 include the LAN, the WAN, and the Internet. The client terminals 203 and 204 each perform communication to and from the server 202 via the computer network 201. Note that, it is assumed in this embodiment that the client terminals 203 and 204 and the server 202 each have the configuration of the information processing device, which is illustrated in FIG. 1. However, the configuration of each of the client terminals 203 and 204 and the server 202 is not limited to the one illustrated in FIG. 1, and each of the client terminals 203 and 204 and the server 202 may also have other functions. Further, the server 202 is not limited to a stand-alone computer, and may also be a rack-mount system.

Assumed is a mode in which a document management system according to this embodiment runs on the server 202 and uses the smartphone 204 as its client terminal. However, the following modes can also be employed. Specifically, the document management system runs on the client terminal 203 or 204, or the server 202 and the client terminals 203 and 204 share processing to be performed.

As used herein, the "document management system" means a system running on a computer, which is configured to store and manage electronic documents and digitized paper documents. The "electronic document" (hereinafter abbreviated as "document") means data that can be expressed in a file format on a computer, and is not limited to document contents expressed by letters. The documents include various contents such as an image and a video.

In an example of the mode in which the document management system according to this embodiment runs on the server 202, server applications including a database, an application server, and a Web server are installed in the server 202. A Web browser or a dedicated client application is installed in each of the client terminals 203 and 204. When a request to acquire data is transmitted from one of the client terminals 203 and 204 to the server 202, the Web server of the server 202 receives the request from the client. The application server then interprets details of the request and acquires necessary data from the database. The application server then transmits the acquired data to the one of the client terminals 203 and 204 via the Web server. When the one of the client terminals 203 and 204 receives the data, the Web browser or dedicated client application of the client terminal displays the acquired data on the display device 114 of the client terminal.

Figure 3A:
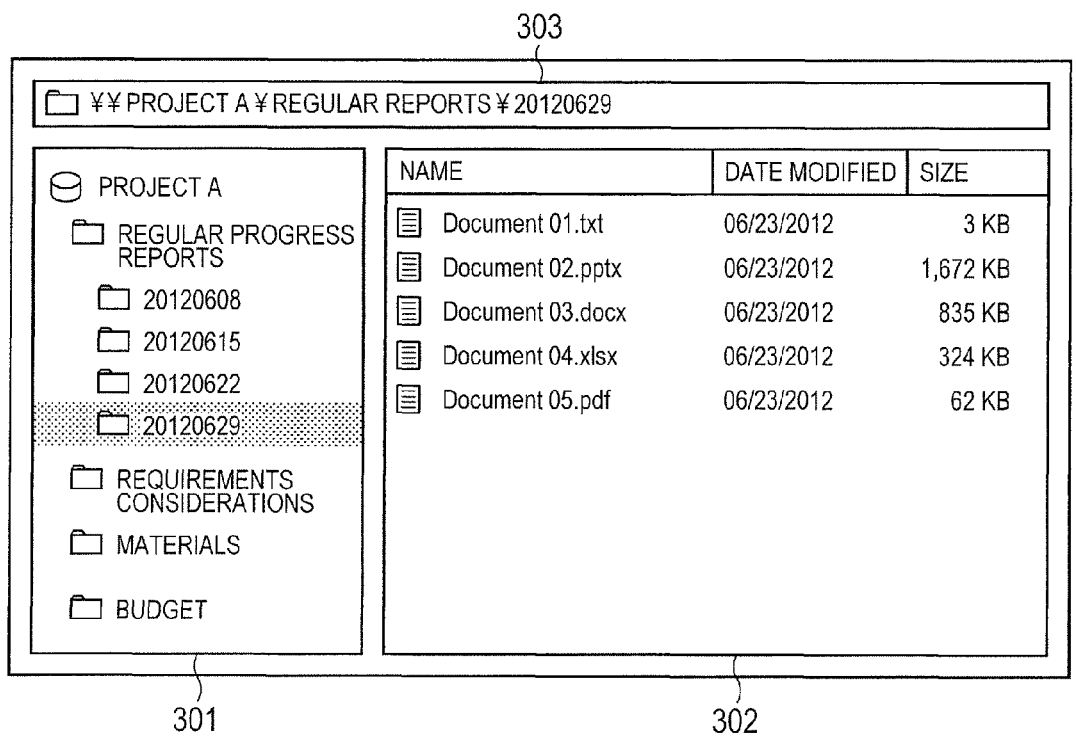
FIGS. 3A and 3B are each a screen example when data stored in a document management system is displayed.
Figure 3B:
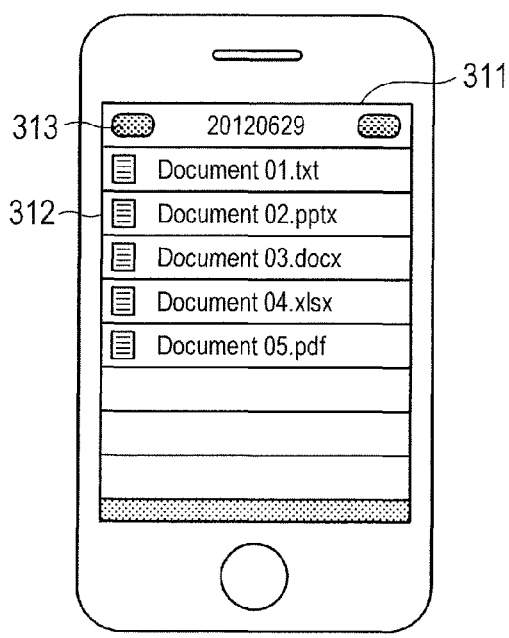

FIGS. 3A and 3B are examples of screens that are respectively displayed on the client terminals 203 and 204 connected to the document management system. FIG. 3A is a screen example displayed on the client PC 203. A tree view 301 of FIG. 3A displays a group of data stored in the document management system in a hierarchical manner. The tree view 301 enables the user to confirm and select the data stored in the document management system in a panoramic manner. A list view 302 displays a list of data stored at a location selected in the tree view 301. A location path 303 indicates a location of currently displayed data. In the example of FIG. 3A, a location "20120629" under "Regular Progress Reports" under "Project A" is selected, and a list of documents stored at the location "20120629" is displayed.

FIG. 3B is a screen example displayed on the smartphone 204. A title bar 311 indicates the location of data. A list view 312 displays a list of data stored at the selected location. The screen size of the smartphone is limited, and hence it is difficult for the smartphone to display a view such as the tree view with which the user views the documents in a panoramic manner and selects the location of the document in a panoramic manner. The user therefore searches folders of a hierarchal document structure one by one from the top level of the structure so that a desired document is displayed. In order to move between hierarchical levels, the user operates the list view 312 or a back button 313 for returning to an upper hierarchical level. With the above-mentioned hierarchal document structure of FIG. 3B which has hitherto been used, it is difficult for the user to access the data with the use of a terminal whose screen size is limited such as the smartphone.

By the way, in the Internet, data management using an electronic bulletin board system has become widespread. In the electronic bulletin board system, a method in which a group of data on a specific topic or subject is collectively displayed is often used, and such a method is called "thread float bulletin board system". Further, a group of data on a specific topic or subject is called "thread" or "topic", and there is also known a display method called "timeline" in which pieces of data are arranged in chronological order. Also, in the description of this embodiment, a group of documents relating to a specific topic or subject is treated as the thread, and is hereinafter referred to as "thread". The documents arranged in chronological order are also treated as the thread.

FIG. 4 is a conceptual diagram when the documents stored in the document management system are expressed as the threads. FIG. 4 illustrates thread names 401, and also illustrates lines 402 each indicating the thread in a conceptual manner, which means that, in other words, four threads are illustrated in FIG. 4. A unit of data access 403 is arranged on each thread, and in the description of this embodiment, this unit is hereinafter referred to as "location container", which means that, in other words, a thread "'Project A' regular progress reports" of FIG. 4 includes four location containers. Data stored in the location container is not limited to one file, and may be a plurality of files and a folder having a hierarchical structure. Further, a number assigned to the location container 403 indicates a date. The location container holds a date/time attribute, which serves as reference information when the location containers are arranged in chronological order. The date/time attribute is held as a property of the location container, but other than the property, the date/time attribute may also be a modified or created date of a file or folder, or a folder or file name indicating a date/time.

Figure 5A:
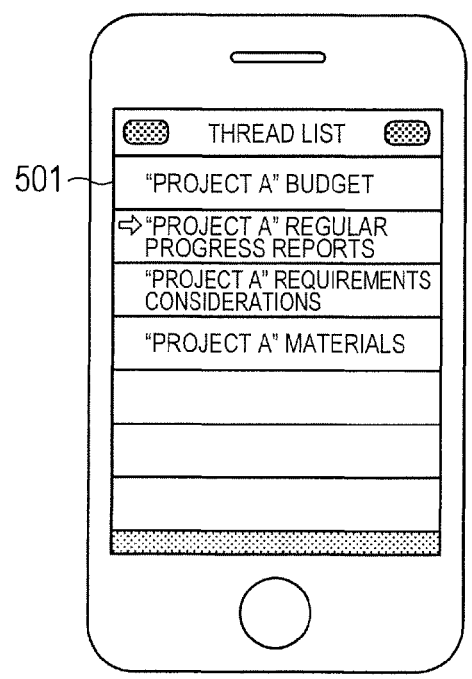
FIGS. 5A, 5B and 5C are each a screen example when data having a thread structure is displayed on a smartphone.
Figure 5B:
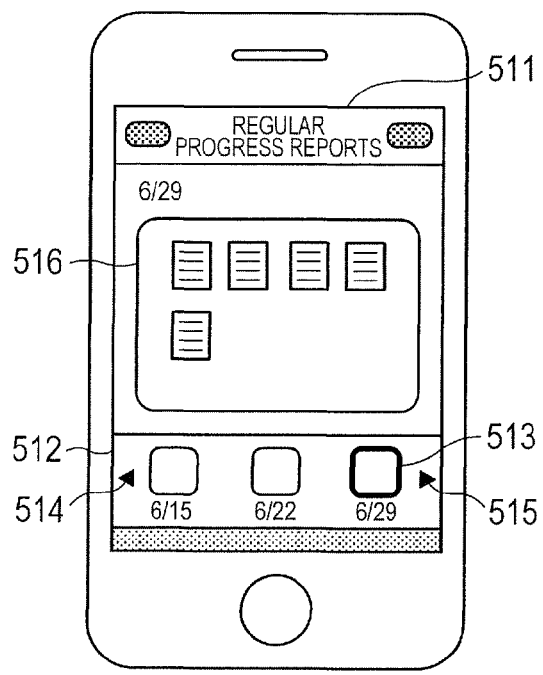
Figure 5C:
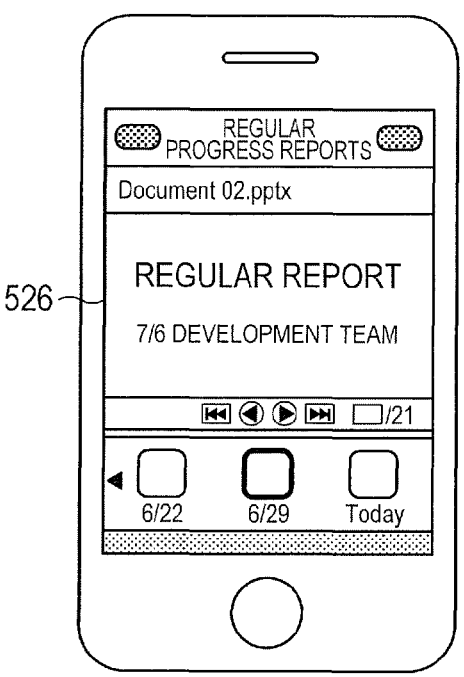

FIGS. 5A to 5C are each a screen example when the data of the document management system having the thread structure illustrated in FIG. 4 is displayed on the smartphone 204. FIG. 5A is a screen example in which the smartphone 204 displays a list of threads. A list view 501 displays the list of threads. Although not shown in particular, the smartphone 204 may also have a function of filtering the thread to be displayed.

FIG. 5B is a screen example in which the smartphone 204 displays the details of the selected thread. A thread name 511 indicates a thread name selected in the title bar. A pane 512 displays the details of the thread, and displays the details of the thread in chronological order in its horizontal direction. Location containers 513 on the thread mean that three location containers are displayed in FIG. 5B. When the pane 512 for displaying the details of the thread is scrolled in its left and right directions, other location containers included in the thread can be displayed. Direction indicator icons 514 and 515 indicate that the pane 512 can be scrolled in its left and right directions, respectively. The direction indicator icon 514 is displayed when the pane 512 can be scrolled in the left direction and the direction indicator icon 515 is displayed when the pane 512 can be scrolled in the right direction. Examples of the scroll operation include a method in which the pane 512 is flicked in the left or right direction. A list view 516 displays the documents included in the location container. The list view 516 is displayed when the location container 513 is clicked. Although the documents are displayed in the form of icons in FIG. 5B, the documents may also be displayed in a list format with the use of their location or document names.

FIG. 5C is a screen example in which the details of the document are displayed. When the document is selected in the list view 516, a document viewer 526 displays the details of the document after the list view 516 is switched to the document viewer 526. In FIG. 5C, other components including the title bar 511 and the pane 512 for displaying the details of the thread are displayed as they are. The operability is enhanced by displaying the thread displaying pane and the view at the same time in this manner. Note that, in a case where the location container 513 stores a single document, the document viewer 526 is displayed when the location container 513 is clicked.

When the documents are displayed in the thread structure in this manner, the hierarchical levels are reduced so that the data can be easily accessed even with the use of the smartphone or the like. When the user tries to move between the threads, however, the user needs to take the trouble of returning to the thread list screen of FIG. 5A to select the thread, and then moving to a predetermined location container included in the selected thread. Now, a method for solving this problem is described.

Figure 6:
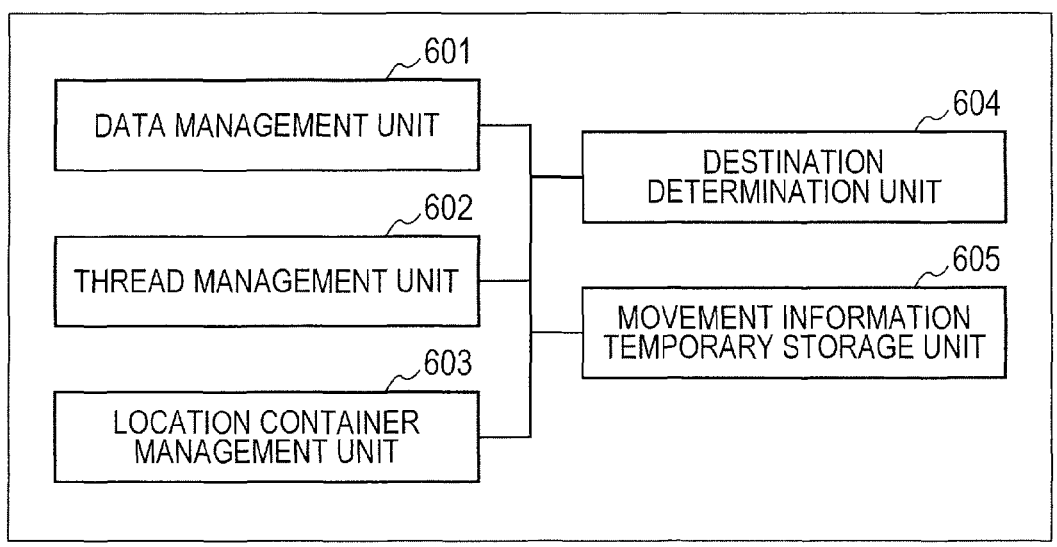
FIG. 6 is a functional block diagram of the document management system according to one embodiment of the present invention.

FIG. 6 is a functional block diagram of the document management system according to this embodiment. Functional blocks of FIG. 6 are mainly executed by the server 202, but may run on the client terminals 203 and 204.

A data management unit 601 stores and manages the documents. A thread management unit 602 creates and manages the threads. As used herein, the "thread" means the group of documents relating to the specific topic or subject as described above. The threads include the one created explicitly by the user and a timeline in which related documents or location containers are arranged in chronological order. A location container management unit 603 creates and manages the location containers. The location container management unit 603 also has a role of associating, through use of the location container, the contents stored in the data management unit 601 and the threads stored in the thread management unit 602 with each other.

A destination determination unit 604 determines a destination thread and a destination location container in the movement from one thread to another thread, which is described later. A movement information temporary storage unit 605 temporarily stores movement information determined by the destination determination unit 604. In the movement from one thread to another thread, which is described later, the destination is determined not fixedly but dynamically. The movement information is therefore stored for each user in the movement information temporary storage unit 605, and the stored movement information is used at the next access. Note that, such an embodiment that the movement information temporary storage unit 605 exists on an application on the smartphone 204 is also conceivable.

Figure 7:
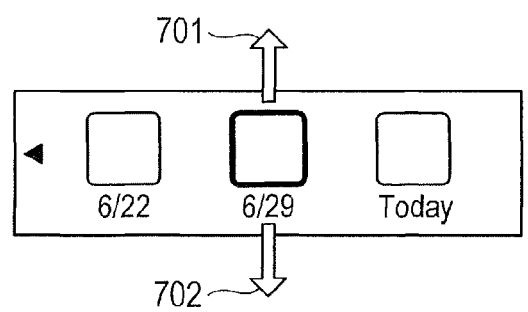
FIG. 7 illustrates an example of an operation when a thread moves from one thread to another thread.

FIG. 7 is a diagram illustrating an example of an operation when the thread moves from one thread to another thread. Illustrated in FIG. 7 is a pane for displaying the details of the thread, and corresponds to the pane 512 of FIG. 5B. Arrows 701 and 702 conceptually indicate directions of the operation, and are not actually displayed. When the location container on the thread is flicked in an upper or lower direction as indicated by the arrow 701 or the arrow 702, it is possible to move to another thread. A source location container can be determined based on a location at which the flick operation has been performed. Note that, the location container that is currently selected may be determined as the source location container. Further, as the direction indicator icons 514 and 515 of FIG. 5B, whether the thread can move in the upper or lower direction may be explicitly indicated by the direction indicator icons. It is possible to save the trouble of returning to the thread list screen of FIG. 5A by enabling the direct movement from the thread displaying pane to another thread.

The operation in which the thread moves to another thread has been described with reference to FIG. 7. Next, processing of determining the destination is described with reference to FIGS. 8 to 12. The processing of determining the destination includes processing of determining the destination thread and processing of determining the location container included in the determined thread. Those procedures of processing are executed by the destination determination unit 604 of the functional block diagram of FIG. 6.

Figure 8:
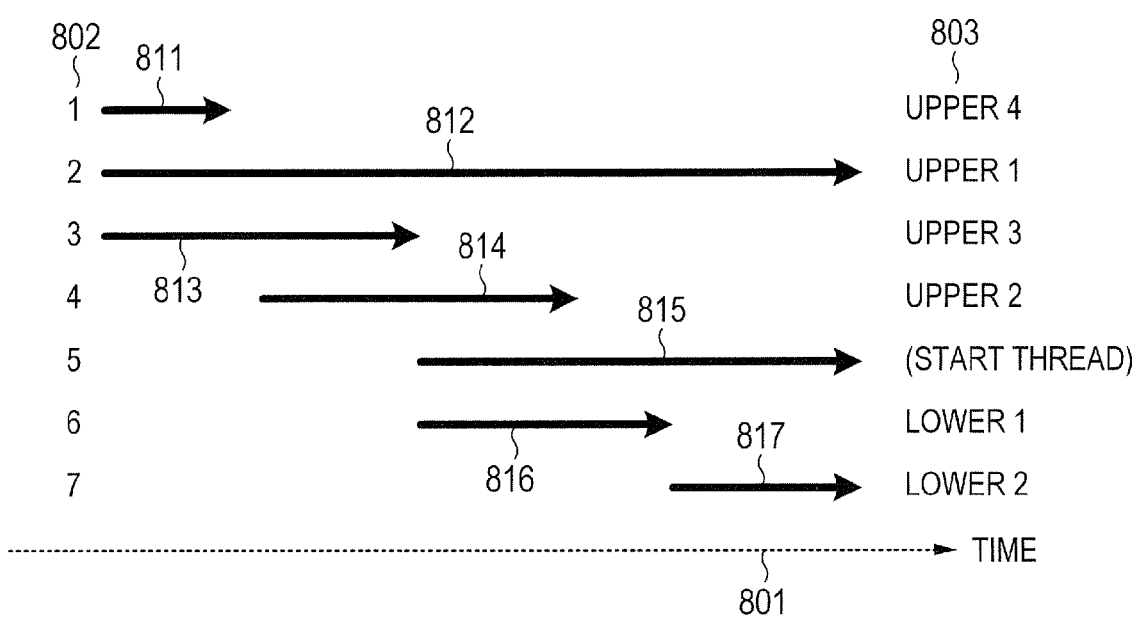
FIG. 8 is diagram conceptually illustrating an order of a plurality of threads.
Figure 9:
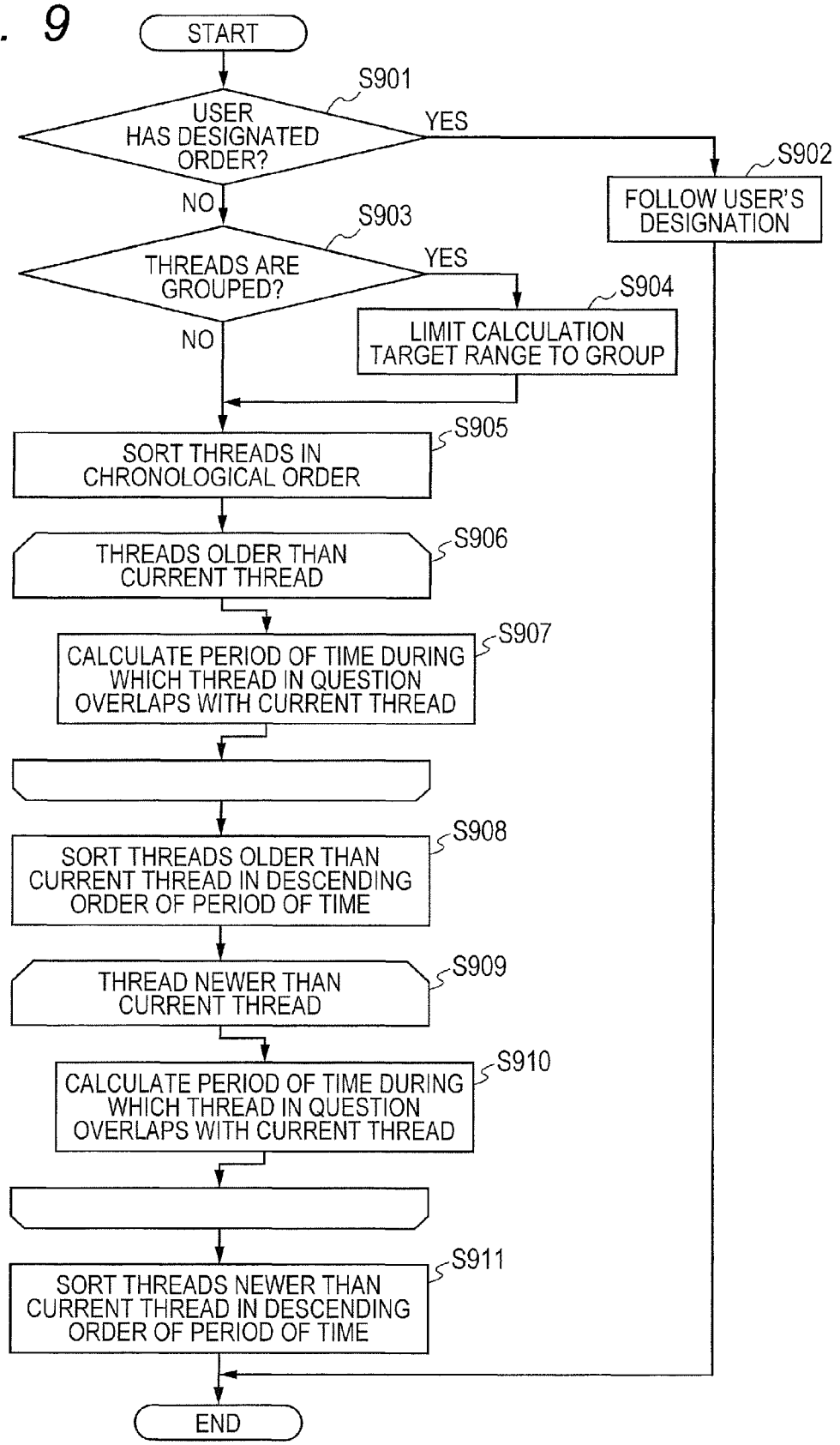
FIG. 9 is a flow chart of processing of determining a destination thread.

First, the processing of determining the destination thread is described with reference to FIGS. 8 and 9. FIG. 8 is a diagram conceptually illustrating the order of the plurality of threads. FIG. 9 is a flow chart of the processing of determining the destination thread. Note that, a program relating to this flow chart is stored in the storage device 104 of the server 202, and is read into the memory 103 to be executed by the CPU 102.

In the processing of determining the destination thread, first, the destination determination unit 604 confirms whether or not the user has designated the order of threads (S901). The information on the thread is acquired from the thread management unit 602. Examples of a method of designating the order include a method in which the user sets the order in advance and a method in which the user designates the destination thread when the thread moves to another thread. In the method in which the user sets the order in advance, information on the order is stored in the thread management unit 602, and the destination determination unit 604 reads the information on the order from the thread management unit 602. In the method in which the user designates the destination thread when the thread moves to another thread, information acquired through the user's operation performed on the display device 114 of the smartphone 204 is transmitted to the server 202, and the information on the order is given as input data of this determination processing. When the user has designated the order, the destination determination unit 604 determines the destination thread in accordance with this designation (S902).

When the user has not designated the order, the destination determination unit 604 confirms whether or not the threads are grouped (S903). The "grouping" means, for example, such a setting that the threads of "Project A" are regarded as a group in FIG. 4. In the processing of determining the destination thread, as the number of threads becomes larger, the speed of processing becomes slower and it is more likely that the current thread moves to a less relevant thread. With the grouping, it is possible to narrow down the threads to which the current thread is to move, and also limit the threads to highly relevant threads. When the grouping has been set in Step S903, the destination determination unit 604 limits a range of the threads to which the current thread is to move (target range) to the group (S904). FIG. 8 conceptually illustrates the threads included in the target range. Lines 811 to 817 of FIG. 8 conceptually indicate the threads, and their lengths represent their respective periods of time indicated by a time axis 801. The period of time of the thread corresponds to a time interval between a date/time at which the thread is created to the date/time attribute held by the latest location container. However, as in a case where a timeline is automatically created, in a case where the thread is automatically created, the date/time attribute of the oldest location container is a start point of the thread. FIG. 8 illustrates seven threads as threads on which the destination determination processing is to be performed (target threads).

When the target threads are determined, the destination determination unit 604 sorts the threads in chronological order of the start point of the thread (S905). Numbers 802 of FIG. 8 indicate numbers of the threads sorted in chronological order. Next, the destination determination unit 604 extracts the threads older than a current thread (S906), and calculates a period of time during which each of the threads overlaps with the current thread (S907). In FIG. 8, a thread 815 corresponds to the current thread and threads 811 to 814 correspond to the threads older than the current thread. Next, the destination determination unit 604 sorts the threads in descending order of the period of time calculated in Step S907 (S908). In FIG. 8, among the threads 811 to 814 older than the current thread, the thread 812 has the longest period of time overlapping with the current thread 815. The thread 814 has the second longest overlapping period of time. The threads 811 and 813 has no overlapping period of time, and hence the order is determined as "threads 813 and 811" in ascending order of a distance from the current thread in accordance with the order determined in the sorting of Step S905. The threads are classified into the ones older than the current thread and the ones newer than the current thread as in the description of Step S906. This operation is related to the operation described with reference to FIG. 7 in which the location container is flicked in the upper or lower operation. When the location container is flicked in the upper direction, the thread older than the current thread is determined as the thread to which the current thread is to move, and when the location container is flicked in the lower direction, the thread newer than the current thread is determined as the thread to which the current thread is to move. In other words, when the current thread 815 is flicked in the upper direction, the order of the destinations is "threads 812, 814, 813, and 811". FIG. 8 illustrates an order 803 of those threads.

Next, the destination determination unit 604 extracts the threads newer than the current thread (S909), and calculates a period of time during which each of the threads overlaps with the current thread (S910). Then, the destination determination unit 604 sorts the threads in descending order of the period of time calculated in Step S910 (S911). In FIG. 8, the calculating of the overlapping period and the sorting of the threads are performed on the current thread 815 and the threads 816 and 817, and when the current thread 815 is flicked in the lower direction, the order of the destinations is "threads 816 and 817".

As described above, the destination thread is determined with the use of the current thread 815 as the start point, and the determined order is held until a series of operations is finished. If the destination is calculated every time the thread moves, the orders are inconsistent with one another, and hence the determined order is temporarily held in this embodiment. The movement information temporary storage unit 605 of the functional block diagram of FIG. 6 holds the movement information. Note that, for example, a function of explicitly performing again processing of determining the arrangement order of the threads may be provided. Alternatively, a method in which the destination is calculated every time the thread moves may be employed.

Next, the processing of determining the destination location container is described with reference to FIGS. 10, 11, and 12. Note that, as in the case of FIG. 9, programs relating to flow charts of FIGS. 11 and 12 are also stored in the storage device 104 of the server 202, and are read into the memory 103 to be executed by the CPU 102.

Figure 10:
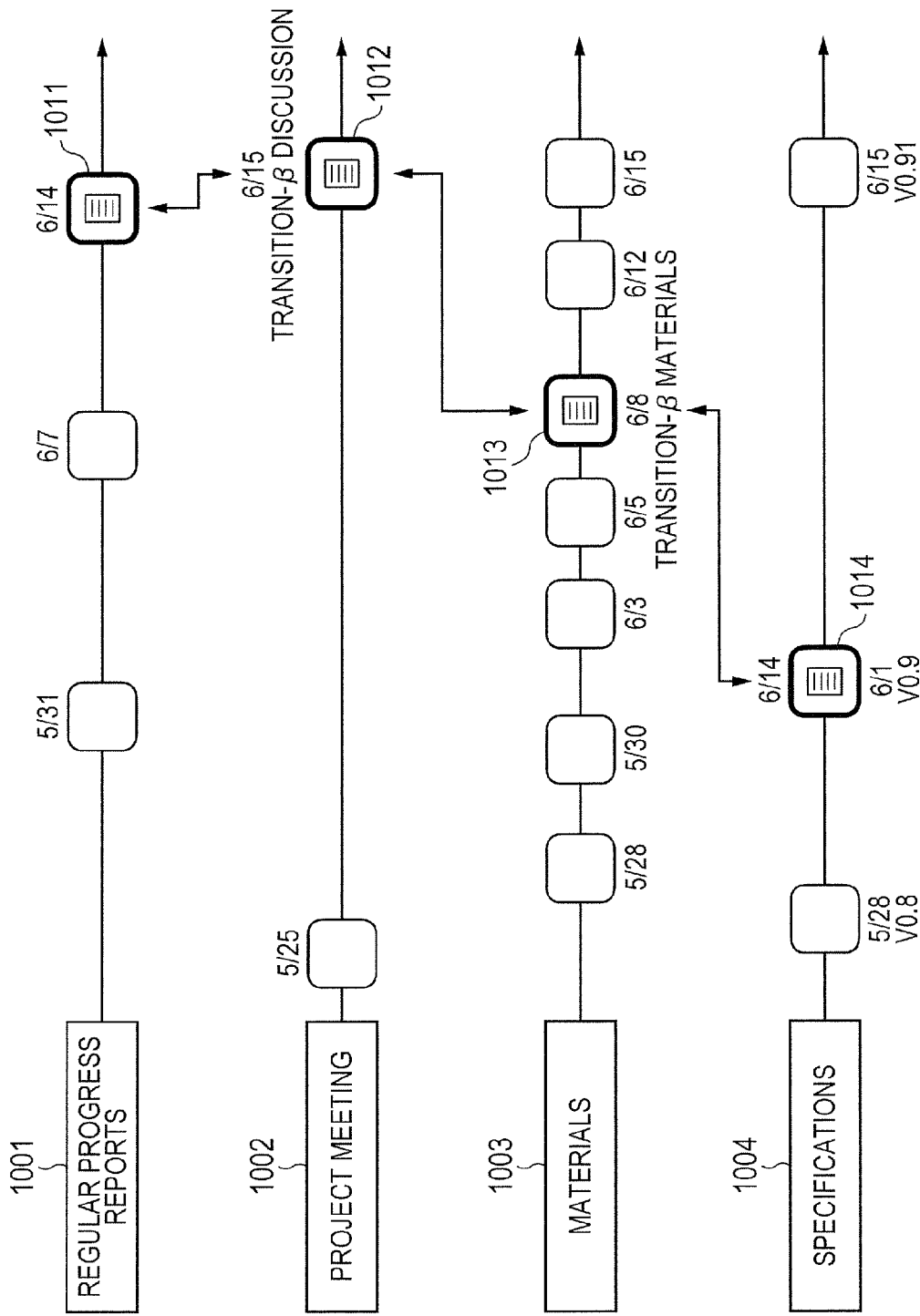
FIG. 10 illustrates an example of determining a location container included in a thread.

FIG. 10 is a diagram illustrating an example of determining the location container included in the thread. FIG. 10 illustrates threads 1001 to 1004. It is assumed that the thread 1002 is the current thread. FIG. 10 partially illustrates the periods of time of the respective threads, and it is assumed that the order of the threads are determined as illustrated in FIG. 10 in accordance with the processing of the flow chart of FIG. 9. As a method of determining the destination location container, the following two methods are described. Specifically, a method of determining the destination location container based on the date/time attribute and a method of determining the destination location container based on index information are described below.

Figure 11:
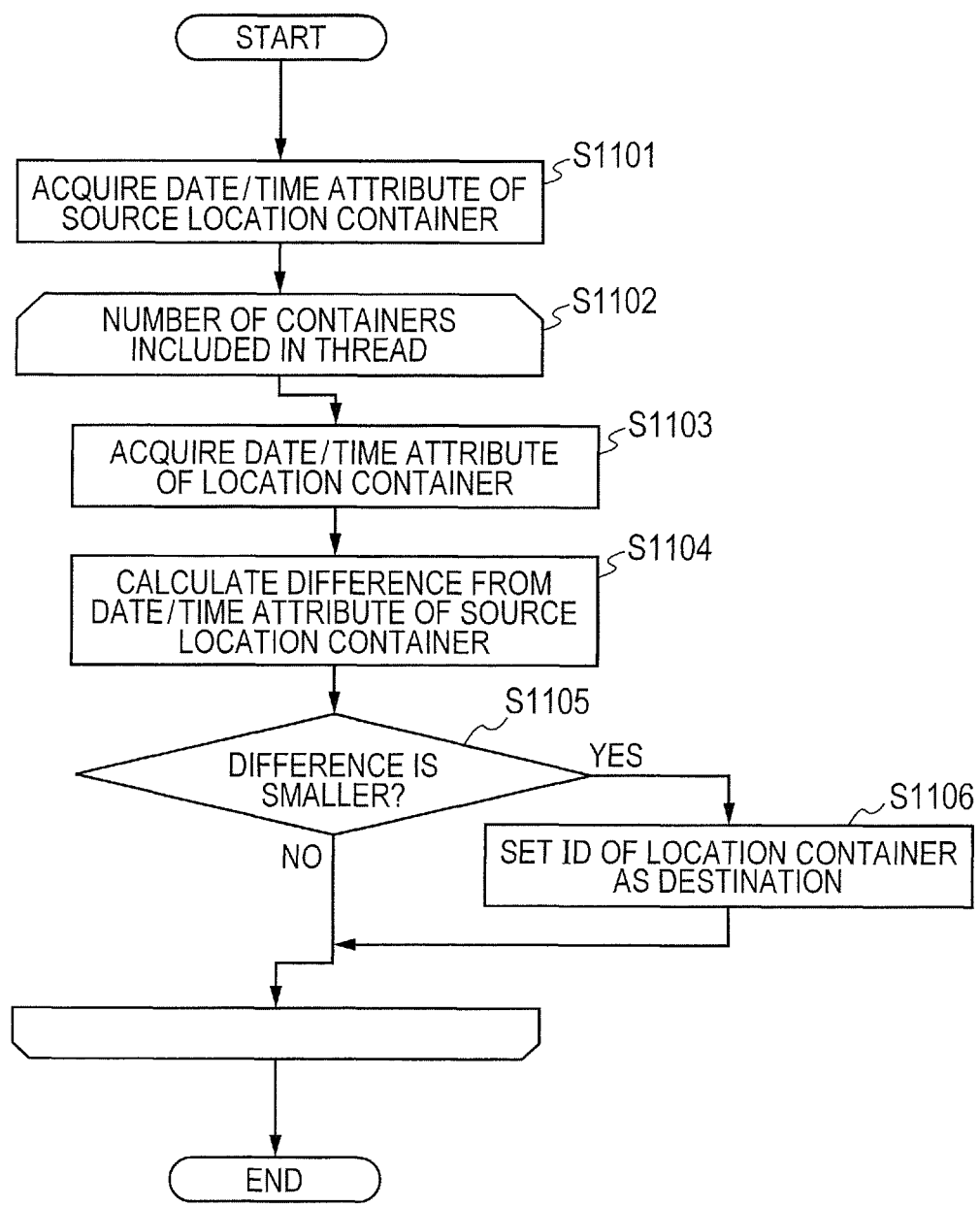
FIG. 11 is a flow chart of processing of determining the location container based on a date/time attribute.
Figure 12:
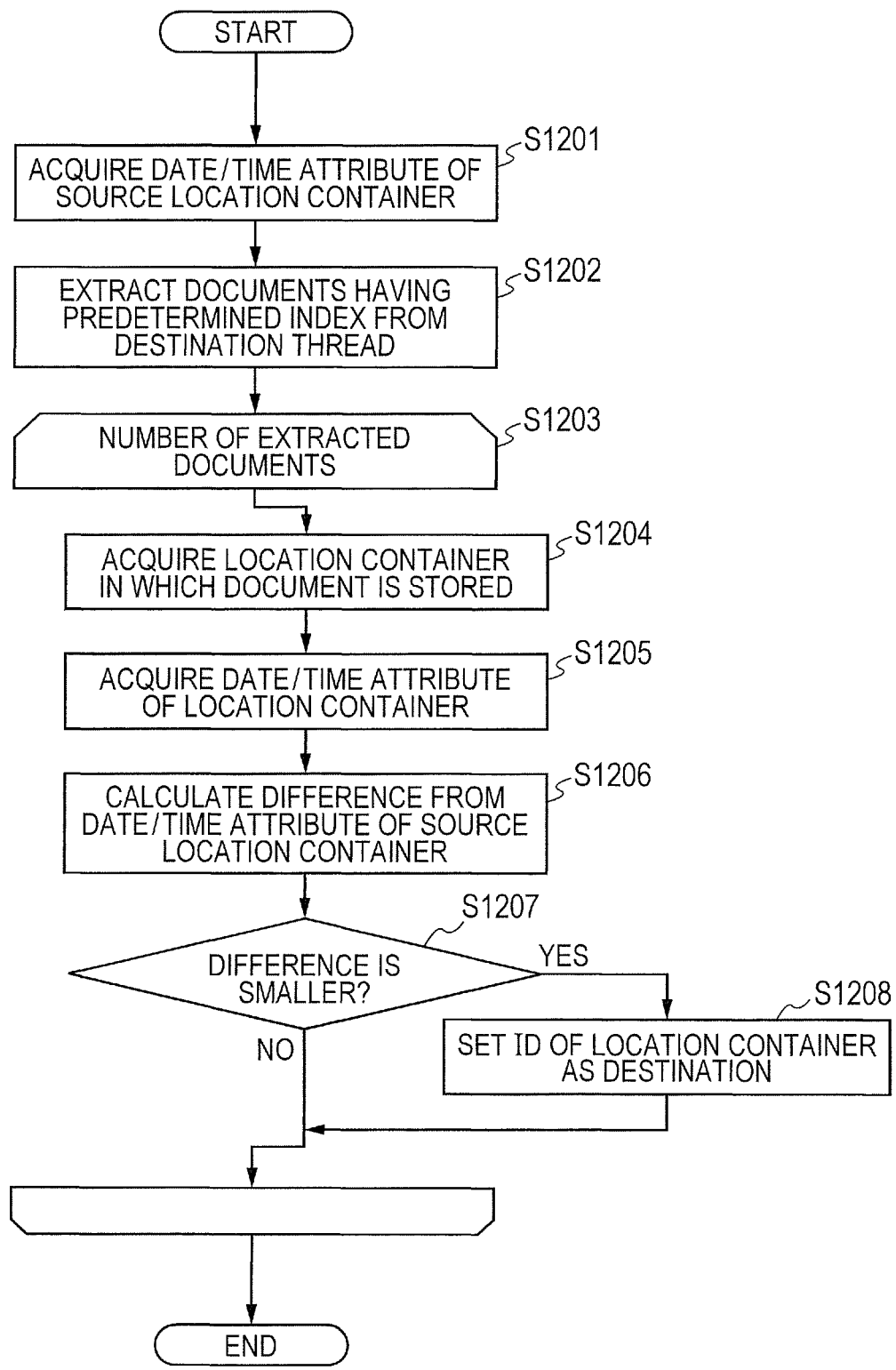
FIG. 12 is a flow chart of processing of determining the location container based on index information.

FIG. 11 is a flow chart of processing of determining the destination location container based on the date/time attribute. The method of determining the destination location container based on the date/time attribute is described with reference to the current thread 1002 and the thread 1001 of FIG. 10. In FIG. 11, first, the destination determination unit 604 acquires the date/time attribute of the source location container (S1101). Information on the source location container is stored in the location container management unit 603. The destination determination unit 604 uses an ID of the location container arranged on the thread as a key to acquire detailed information on the location container from the location container management unit 603. In the example of FIG. 10, the destination determination unit 604 acquires the date/time attribute of a location container 1012 arranged on the current thread 1002. Next, the destination determination unit 604 refers to the location containers included in the destination thread (S1102), and acquires the date/time attributes of the respective location containers (S1103), and calculates a difference between each of the date/time attributes and the date/time attribute of the source location container acquired in Step 1101 (S1104). The destination determination unit 604 then compares the differences calculated for the respective location containers with one another (S1105), and determines the location container having the smallest difference as the destination (S1106). In the example of FIG. 10, the destination determination unit 604 acquires the date/time attributes of the respective location containers of the destination thread 1001, calculates the difference from the date/time attribute of the source location container 1012, and determines a location container 1011 having the smallest difference as the destination. Note that, every location container of the destination thread is confirmed in the flow chart of FIG. 11, but in order to speed up the processing, information on the arrangement order of the location containers on the thread may be held in advance in the thread management unit 602.

Next, the method of determining the destination location container based on the index information is described with reference to the current thread 1002 and the threads 1003 and 1004 of FIG. 10 and to FIG. 12. In a location container 1013 of the thread 1003 of FIG. 10, the documents related to the location container 1012 of the current thread 1002 are stored. As in this case, in the document management, related information is not necessarily stored in the location container whose date/time attribute is close to that of the current thread. The index information is used in this case. The "index" means information added to data, and is also called "tag" and "key". The location container 1013 and a location container 1014 of FIG. 10 store the documents having the same index information.

FIG. 12 is a flow chart of processing of determining the location container based on the index information. In FIG. 12, the destination determination unit 604 first acquires the date/time attribute of the source location container (S1201). In the example of FIG. 10, the destination determination unit 604 acquires the date/time attribute of the location container 1012 arranged on the current thread 1002. Next, the destination determination unit 604 extracts the documents having a predetermined index from the location containers included in the destination thread (S1202). The destination determination unit 604 acquires, from each document extracted (S1203), the location container in which the document is stored (S1204), and acquires the date/time attribute of the location container (S1205). Next, the destination determination unit 604 calculates a difference between the date/time attribute of the source location container acquired in Step S1201 and the date/time attribute acquired in Step S1205 (S1206). The destination determination unit 604 then compares the differences calculated for the respective location containers with one another (S1207), and determines the location container having the smallest difference as the destination (S1208). In some cases, there are a plurality of files having the predetermined index in the thread. When there are a plurality of files having the predetermined index, the location container whose date/time attribute information is close to that of the current thread is determined as the destination. In the example of FIG. 10, the document of the location container 1013 has the predetermined index, and hence the location container 1013 is determined as the destination. Similarly, the location container 1014 stored in the thread 1004 stores a file having the predetermined index, and hence when the thread moves from the location container 1013 of the thread 1003 to the thread 1004, the location container 1014 is determined as the destination.

Note that, in regards to selection as to whether the destination location container is to be determined based on the date/time attribute or the index information, a method in which the user sets this selection in advance and a method in which the user makes this selection when the thread moves to another thread are conceivable. Two examples of the date/time attribute and the index information have been described above, but other types of information may be used for comparison. As another example, a plurality of pieces of information may be used for comparison. When the plurality of pieces of information are used for comparison, a method in which a priority level is set for each piece of information to be used for comparison and a method in which all of the items to be used for the comparison are used comprehensively to determine the destination. The following method is conceivable as an example of the method in which the priority level is set. Specifically, the location containers are compared with each other with the use of the date/time attribute and when there are location containers having the same the date/time attribute, the destination is determined with the use of another item.

Through the operation of moving between the threads and the processing of determining the destination described above, it is possible to save the trouble of the operation of moving to another thread.

Figure 13:
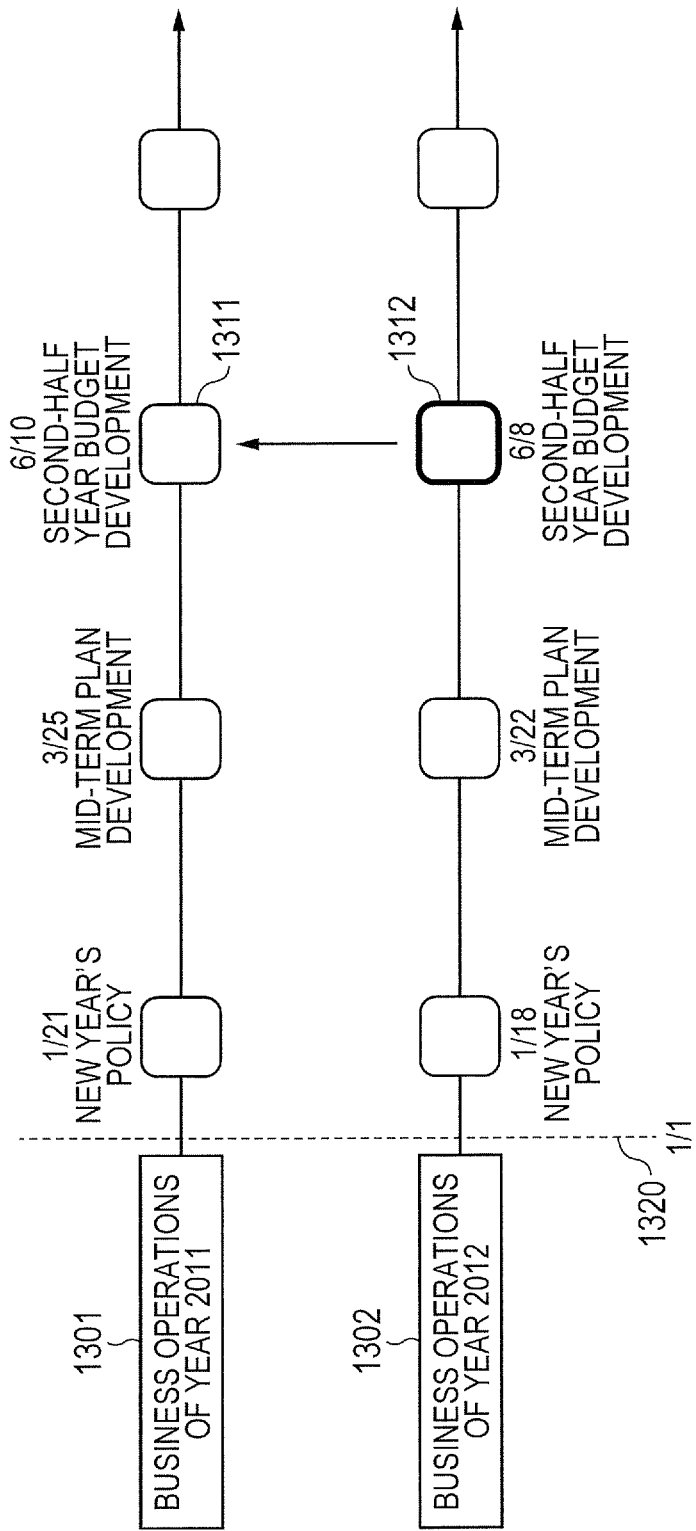
FIG. 13 illustrates an example of adjusting time axes of respective threads in data having a thread structure.

Next, other functions are described with reference to FIGS. 13, 14, and 15. FIG. 13 illustrates an example of adjusting time axes of the respective threads. For example, a routine business operation executed every year at a fixed time of year is managed as a thread in some cases, and in such a thread, the user may desire to refer to past information of the same time of year. However, if the threads are compared with each other on the same time axis, the threads do not have an overlapping period and further, a desired destination location container is not the location container of the same time of year. Accordingly, with the destination determination processing described above, it is highly likely that the desired destination location container is not determined as the destination. In view of this, processing of matching the start points of the respective threads without arranging the threads on the same time axis is performed. FIG. 13 illustrates a thread 1301 and a thread 1302, and the thread 1301 stores business operations of the year 2011 and the thread 1302 stores business operations of the year 2012. For example, a case where when the user currently refers to data of a location container 1312, the user desires to refer to a location container 1311, which is past information, is conceivable. In this case, as indicated by a dotted line 1320, the start point of each of the threads is adjusted to January 1 of the corresponding year. In this way, it is possible to move from the location container 1312 to the location container 1311.

Figure 14:
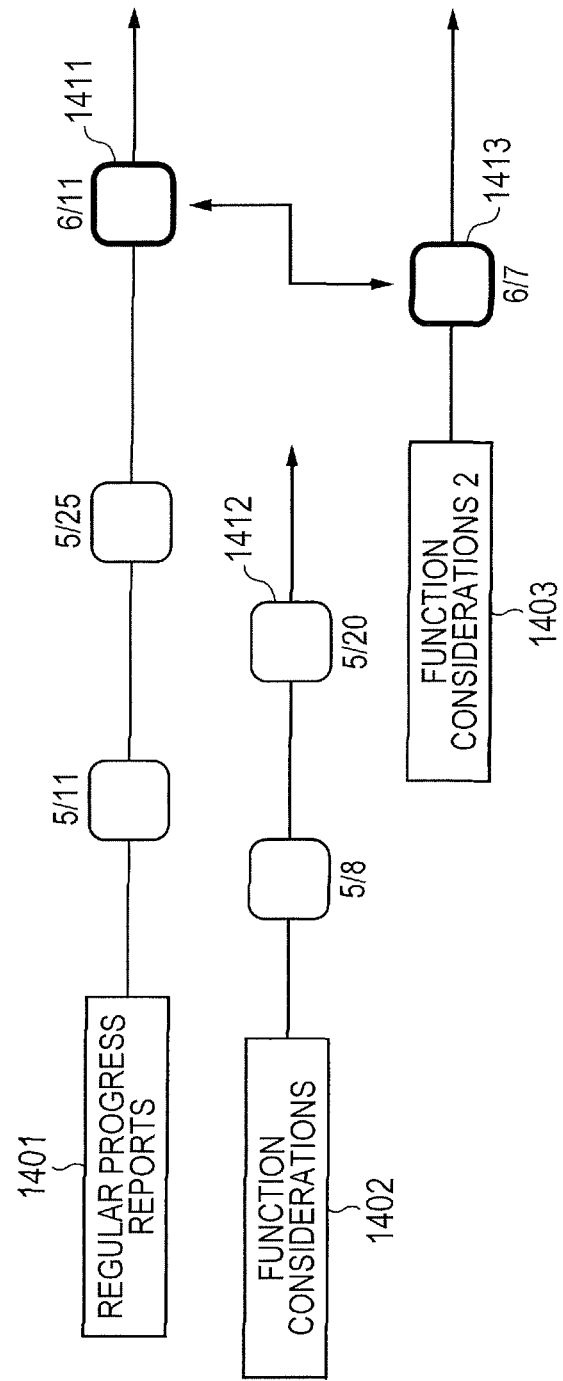
FIG. 14 illustrates an example of changing a destination thread in movement to another thread.

FIG. 14 illustrates an example of changing the destination thread. When a location container 1411 of a thread 1401 is flicked in the lower direction on the assumption that data of the location container 1411 is currently referred to, the current location container moves to a location container 1412 of a thread 1402 with the processing of the flow charts of FIGS. 9 and 11. However, when there is a large difference between the date/time attributes of those location containers, information stored in the location container 1411 and information stored in the location container 1412 may be less relevant to each other. Under such situation, when a location container 1413 including a document whose date/time attribute is close to that of the current location container or having the predetermined index is included in another thread 1403, it is possible to move from the location container 1411 to the location container 1413.

FIG. 15 illustrates an example of a case where the location container returns from the destination location container to the source location container. When a location container 1511 of a thread 1501 is flicked in the lower direction on the assumption that data of the location container 1511 is currently referred to, the location container 1511 moves to a location container 1513 of a thread 1502. When the location container 1513 is flicked in the upper direction, the thread is returned to the thread 1501 because the order of the threads is held. However, the processing of determining the destination location container is performed when the thread moves to another thread, and hence the location container moves to the location container 1512 as a result. However, the user desires to return to the source location container 1511 in many cases. In view of this, by temporarily storing a movement path of the location container as stack information, when the thread is to be returned to the source thread, it is possible to move to the source location container.

As described above, by providing the functions of FIGS. 13, 14, and 15, it is possible to deal with a larger number of thread patterns and operation patterns.

Even in a limited display area such as the display area of the smartphone, the operation of moving between the threads or the timelines is facilitated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-216297, filed Oct. 17, 2013, which is hereby incorporated by reference herein in its entirety.

What is claimed is:

1. A document management system that manages a plurality of documents using a plurality of threads based on relevance among the documents, wherein each of the threads includes containers each including at least one document and having a date/time attribute,
wherein the document management system comprises:
a memory for storing a computer program; and
a processor for executing the computer program to perform:
controlling a display device to display one container included in one thread of the plurality of threads;
selecting, when a flick operation for changing a currently displayed thread to an adjacent thread has been performed by a user, a container that is most relevant to the currently displayed one container from among containers included in the adjacent thread adjacent to the currently displayed thread, wherein the adjacent thread is selected based on an arrangement order of the plurality of threads and a direction of the flick operation; and
controlling the display device to change the currently displayed one container to the selected container included in the adjacent thread.

2. A document management system according to claim 1, wherein the selected container has the date/time attribute that is closest to the date/time attribute of the currently displayed one container from among the containers included in the adjacent thread.

3. A document management system according to claim 2, wherein the selected container has the date/time attribute that is closest to the date/time attribute of the currently displayed one container from among the containers that include at least one document that has the same index information as index information of the at least one document included in the currently displayed one container.

4. A document management system according to claim 1, wherein, if there is a large difference between the date/time attributes of the currently displayed one container and the selected container, the processor further performs controlling the display device to change the currently displayed one container to a container included in another thread different from the adjacent thread.

5. A document management system according to claim 1, wherein the selected container includes at least one document that has the same index information as index information of the at least one document included in the currently displayed one container.

6. A document management system according to claim 1, wherein the processor further performs controlling the display device to display an instruction for changing the currently displayed one container to a selected container of another thread.

7. A document management system that manages a plurality of documents using a plurality of threads based on relevance among the documents, wherein each of the threads includes containers each including at least one document and having a date/time attribute,
wherein the document management system comprises:
a memory for storing a computer program; and
a processor for executing the computer program to perform:
controlling a display device to display one container included in one thread of the plurality of threads;

selecting, when an operation for changing a currently displayed thread to an adjacent thread has been performed by a user, a container that is most relevant to the currently displayed one container from among containers included in the adjacent thread adjacent to the currently displayed thread, wherein the adjacent thread is selected based on an arrangement order of the plurality of threads; and controlling the display device to change the currently displayed one container to the selected container included in the adjacent thread;

holding, as information of a source container and a destination container, movement information on the change of the container; and controlling the display device to return the destination container to the source container if an operation for returning from the destination container to the source container has been performed by the user.

8. A document management method carried out by a processor in a document management system that manages a plurality of documents using a plurality of threads based on relevance among the documents, wherein each of the threads includes containers each including at least one document and having a date/time attribute, wherein the document management method comprises:

displaying one container included in one thread of the plurality of threads;

selecting, when a flick operation for changing a currently displayed thread to an adjacent thread has been performed by a user, a container that is most relevant to the currently displayed one container from among containers included in the adjacent thread adjacent to the currently displayed thread, wherein the adjacent thread is selected based on an arrangement order of the plurality of threads and a direction of the flick operation; and controlling the displaying such that the currently displayed one container is changed to the selected container included in the adjacent thread.

9. A non-transitory computer-readable storage medium storing a computer program that causes a computer to execute a document management method, the method being carried out by a processor in a document management system that manages a plurality of documents using a plurality of threads based on relevance among the documents, wherein each of the threads includes containers each including at least one document and having a date/time attribute, wherein the document management method comprises:

displaying one container included in one thread of the plurality of threads;

selecting, when a flick operation for changing a currently displayed thread to an adjacent thread has been performed by a user, a container that is most relevant to the currently displayed one container from among containers included in the adjacent thread adjacent to the currently displayed thread, wherein the adjacent thread is selected based on an arrangement order of the plurality of threads and a direction of the flick operation; and controlling the displaying such that the currently displayed one container is changed to the selected container included in the adjacent thread.

10. A document management method carried out by a processor in a document management system that manages a plurality of documents using a plurality of threads based on relevance among the documents, wherein each of the threads includes containers each including at least one document and having a date/time attribute, wherein the document management method comprises:

displaying one container included in one thread of the plurality of threads;

selecting, when an operation for changing a currently displayed thread to an adjacent thread has been performed by a user, a container that is most relevant to the currently displayed one container from among containers included in the adjacent thread adjacent to the currently displayed thread, wherein the adjacent thread is selected based on an arrangement order of the plurality of threads;

controlling the displaying such that the currently displayed one container is changed to the selected container included in the adjacent thread;

holding, as information of a source container and a destination container, movement information on the change of the container; and controlling the displaying such that the destination container is returned to the source container if an operation for returning from the destination container to the source container has been performed by the user.

11. A non-transitory computer-readable storage medium storing a computer program that causes a computer to execute a document management method, the method being carried out by a processor in a document management system that manages a plurality of documents using a plurality of threads based on relevance among the documents, wherein each of the threads includes containers each including at least one document and having a date/time attribute, wherein the document management method comprises:

displaying one container included in one thread of the plurality of threads;

selecting, when an operation for changing a currently displayed thread to an adjacent thread has been performed by a user, a container that is most relevant to the currently displayed one container from among containers included in the adjacent thread adjacent to the currently displayed thread, wherein the adjacent thread is selected based on an arrangement order of the plurality of threads;

controlling the displaying such that the currently displayed one container is changed to the selected container included in the adjacent thread;

holding, as information of a source container and a destination container, movement information on the change of the container; and controlling the displaying such that the destination container is returned to the source container if an operation for returning from the destination container to the source container has been performed by the user.

* * * * *